United States Patent [19]

Potter

[11] 4,178,804
[45] Dec. 18, 1979

[54] PRESSURE TRANSDUCERS

[75] Inventor: Peter N. Potter, Ewshot, England

[73] Assignee: The Solartron Electronic Group Limited, Farnborough, England

[21] Appl. No.: 929,396

[22] Filed: Jul. 31, 1978

[30] Foreign Application Priority Data

Aug. 12, 1977 [GB] United Kingdom ............... 33829/77

[51] Int. Cl.$^2$ ............................................. G01L 11/00
[52] U.S. Cl. ............................................. 73/702
[58] Field of Search ......................... 73/702, 708, 32 A

[56] References Cited

U.S. PATENT DOCUMENTS 3,618,360  11/1971  Curtis ...................................... 73/702

FOREIGN PATENT DOCUMENTS 310144  9/1971  U.S.S.R. ...................................... 73/702

Primary Examiner—Donald O. Woodiel
Attorney, Agent, or Firm—W. R. Sherman; K. McMahon

[57] ABSTRACT

A pressure transducer comprises two similar resonantly vibratable cylinders, one disposed coaxially inside the other and each having its own resonant vibration excitation system. A pressure P1 is applied to the inside of the inner cylinder and to the outside of the outer cylinder, while a pressure P2 is applied between the cylinders, whereby the difference in the respective vibration frequencies of the cylinders is dependent on the pressure difference P1−P2. Either P1 or P2 can be a reference pressure, e.g., a vacuum for an absolute pressure version of the transducer. Alternatively, either P1 or P2 can be atmospheric pressure, so that the transducer operates as a gauge pressure transducer.

12 Claims, 2 Drawing Figures

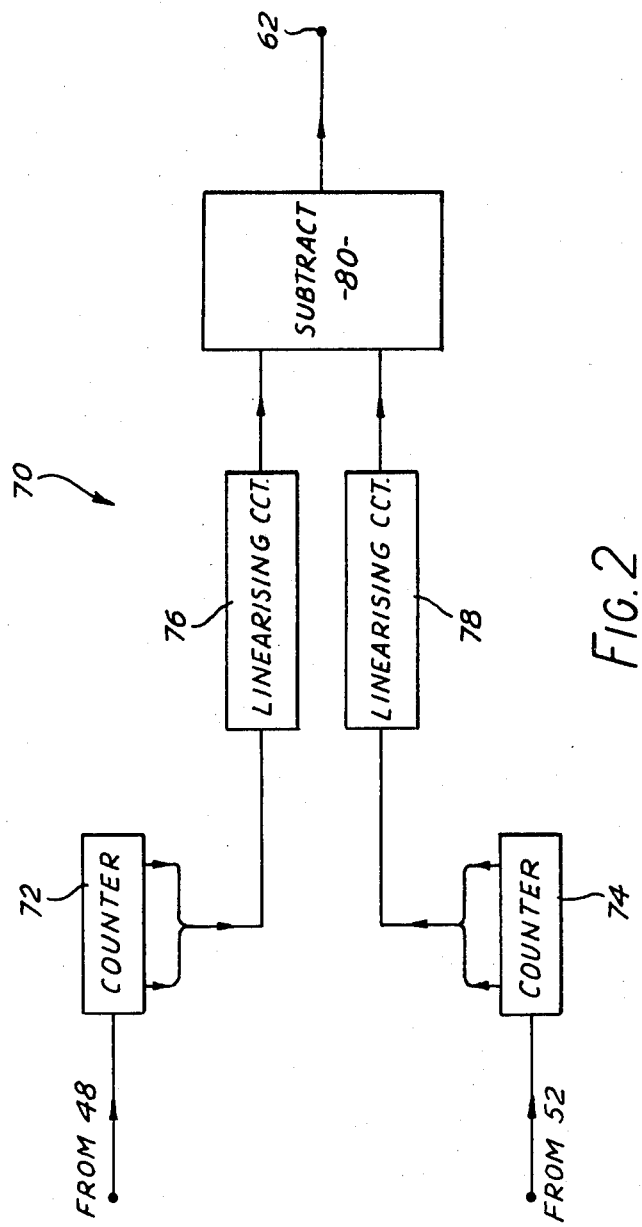

PRESSURE TRANSDUCERS

BACKGROUND OF THE INVENTION

This invention relates to pressure transducers.

One known type of pressure transducer is described in U.K. patent specification No. 827,344, and comprises a hollow resonantly vibratable cylinder closed at one end by an end cap, means for exciting and maintaining resonant vibrations of the cylinder and means for suppling a fluid whose pressure is to be sensed to either the internal or the external surface of the cylinder. This known type of transducer can be made to be extremely accurate, but in order to achieve such accuracy, it is necessary to use a relatively expensive material, with a low temperature coefficient of elasticity, for the cylinder, and it is also necessary to take great care in the manufacture of the cylinder. Further, even the currently most accurate versions of this type of transducer are still subject to a number of limitations: thus they are density sensitive as well as pressure sensitive, which can lead to an error of the order of 0.01% per °C. as the density of the fluid changes with temperature; their cylinder material has a residual temperature coefficient of elasticity of the order of 10 p.p.m. per °C.; they can be subject to long term drift of about 0.02% of full scale over six months; they are subject to an acceleration effect of up to 0.002%/g due to the cylinder end cap applying an axial force to the cylinder wall under axial acceleration; and because of the need to temperature conpensate for the aforementioned density sensitivity, it is difficult to make an accurate differential pressure version unless an absolute value of one of the pressures is known for compensation purposes.

It is an object of the present invention to provide a pressure transducer in which the effects of at least some of the abovementioned limitations are alleviated.

SUMMARY OF THE INVENTION

According to the present invention, there is provided a pressure transducer comprising first and second similar hollow resonantly vibratable bodies whose respective resonant frequencies vary in dependence upon the difference in fluid pressure inside and outside the respective body, means for exciting and maintaining resonant vibrations of the bodies and for producing respective output signals representative of said resonant frequencies, and means for applying a first fluid pressure to the inside of the first body and to the outside of the second body and for applying a second fluid pressure to the inside of the second body and to the outside of the first body, whereby said resonant frequencies vary in opposite senses in dependence upon the difference between said first and second pressures and the difference between said resonant frequencies, as represented by said output signals, is dependent upon said pressure difference.

Thus since the two bodies are similar, temperature changes and changes in the densities of the fluids tend to affect them equally, so that temperature- and density-dependent errors in said resonant frequencies tend to cancel in the frequency difference between said resonant frequencies.

BRIEF DESCRIPTION OF THE DRAWINGS

The invention will now be described, by way of non-limitative example only, with reference to the accompanying drawings, of which:

FIG. 2 is a schematic block diagram of digital output circuit for use in the pressure transducer of FIG. 1.

DETAILED DESCRIPTION OF A PREFERRED EMBODIMENT

Figure 1:
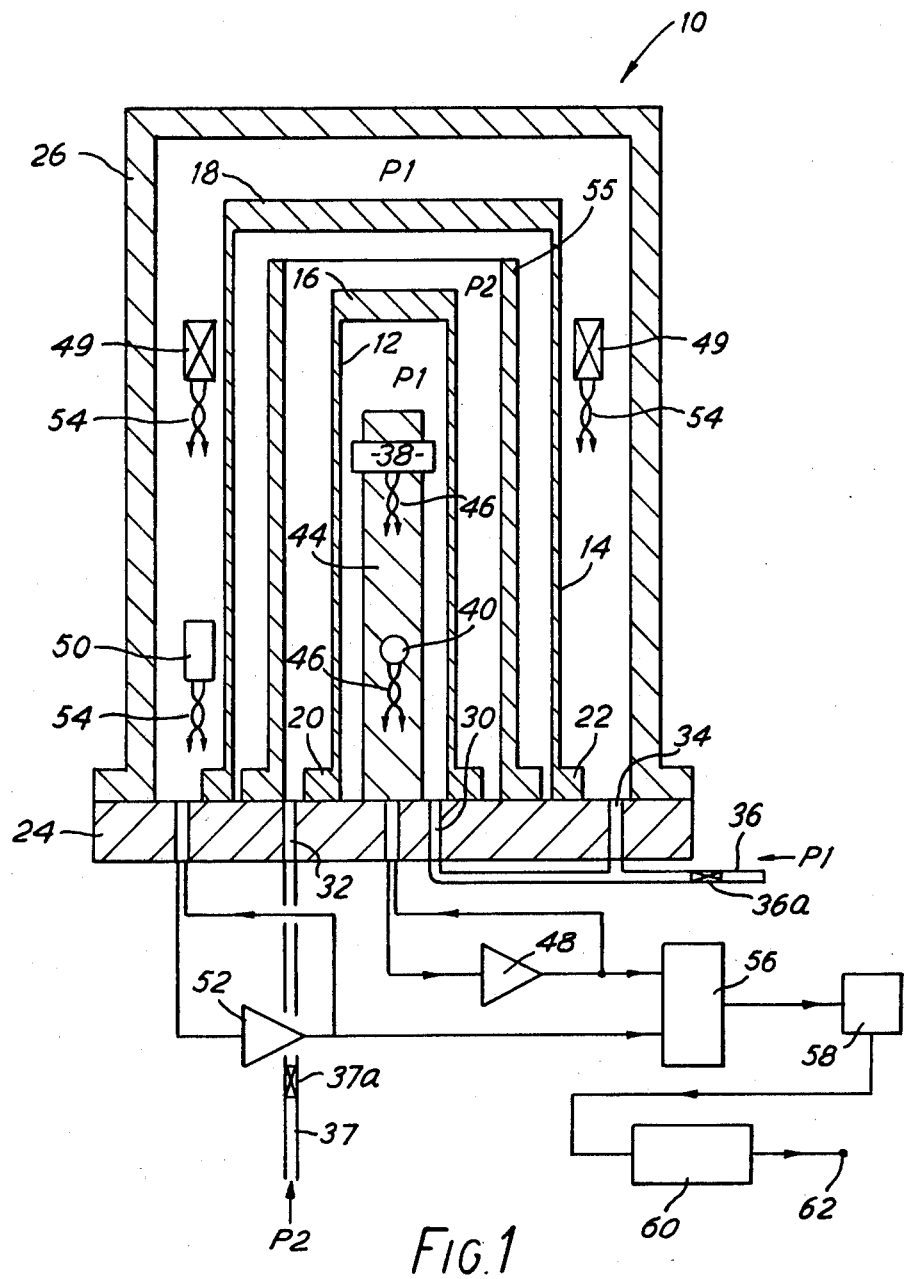
FIG. 1 is a somewhat diagrammatic sectional view of a pressure transducer in accordance with the present invention.

The pressure transducer shown in FIG. 1 is indicated generally at 10, and comprises two thin-walled hollow cylinders 12,14 both made from the same ferromagnetic material: typically, this material is Ni-Span C902, an iron-nickel-chronium alloy manufactured by Henry Wiggin and Company Limited of Holmer Road, Hereford, England. The cylinder 12 is slightly smaller in diameter and slightly shorter than the cylinder 14, and is disposed coaxially inside the cylinder 14: typically, the cylinder 12 is 5.0 cm long and 1.8 cm in diameter, the cylinder 14 is 5.5 cm long and 2.3 cm in diameter, and both cylinders have a wall thickness of the order of 0.01 cm.

One end of the cylinder 12 is closed by an end cap 16 welded thereto, and the corresponding end of the cylinder 14 is similarly closed by an end cap 18. The other end of each of the cylinders 12, 14 is provided with a respective radially outwardly projecting flange, these flanges being indicated at 20 and 22 respectively and being welded or otherwise sealingly secured to a common, substantially circular, base 24.

The cylinders 12,14 are enclosed within a substantially cylindrical casing 26, which is closed at one end and is typically made from aluminum or stainless steel. The casing 26 is substantially coaxial with the cylinders 12,14 and its open end is secured in sealing engagement with the base 24 by bolts (not shown) or any other convenient means. The base 24 contains a first inlet 30 which communicates with the interior of the cylinder 12, a second inlet 32 which communicates with the space defined between cylinders 12,14 and a third inlet 34 which communicates with the space defined between the exterior of the cylinder 14 and the casing 26. A common conduit 36 communicates with the inlets 30 and 34, while another conduit 37 communicates with the inlet 32, the conduits 36,37 containing respective filters indicated diagrammatically at 36a and 37a respectively.

Disposed inside the cylinder 12 are a drive coil 38 and a pick-up coil 40, which respectively serve to excite resonant vibrations of the thin cylindrical wall of the cylinder 12 and to sense the frequency of the vibrations. The coils 38,40 may be moulded into a substantially cylindrical support structure 44 coaxial with the cylinder 12, the support structure 44 typically being made of epoxy resin and being bonded to the base 24. The respective axes of the coils 38 and 40 are perpendicular to the axis of the cylinder 12 and to each other. The pick-up coil 40 is connected, via respectives ones of a plurality of leads 46 which pases in a sealed manner through the base 24, to the input of an amplifier 48, whose output is connected via other ones of the leads 46 to the drive coil 38.

Disposed outside the cylinder 14, in the space defined between the cylinder 14 and the casing 26, are a pair of diametrically opposed drive coils 49 and a pick-up coil 50, which are connected, in a manner analogous to that described in relation to the coils 38 and 40, to the output and input respectively of an amplifier 52 via leads 54.

A perforated, substantially cylindrical, ferromagnetic screen 55 is disposed coaxially between the cylinders 12, 14, the screen 55 being made for example from mu-metal and being welded or otherwise suitably secured to the base 24.

The respective outputs of the amplifiers 48 and 52 are connected to respective inputs of a mixer 56, whose output is connected via a low pass filter 58 and, optionally, a linearising circuit 60, to an output terminal 62 which constitutes the output of the transducer 10.

In operation, a first fluid pressure P1 is applied to the conduit 36, and thence to the interior of the cylinder 12 and to the space defined between the exterior of the cylinder 14 and the casing 26. A second fluid pressure P2 is applied to the conduit 37 and thence to the space defined between the cylinders 12,14. Each of the cylinders 12, 14 is therefore subjected to a pressure difference (P1−P2), but this pressure difference acts upon the cylinders in opposite senses.

When the respective coil/amplifier systems 38,40,48 and 49,50,52 of the two cylinders 12 and 14 are energised, both cylinders vibrate resonantly in a bell-like manner, i.e. in the so-called hoop, or circumferential, mode. The dimensions of the cylinders 12,14 and the arrangement of the magnetic circuit between each coil/amplifier system and its respective cylinder are selected such that both cylinders vibrate in precisely the same circumferential mode at approximately the same frequency. The screen 55 serves to reduce the possibility of interactions between the respective magnetic circuits of the cylinders 12 and 14.

The resonant frequency $f_1$ of the vibrations of the cylinder 12 is related to the pressure difference (P1−P2) by an equation of the form $$(P1-P2) = a + bf_1 + cf_1^2 + df_1^3, \quad (1)$$

where a,b,c and d are constants, and the resonant frequency $f_2$ of the vibrations of the cylinder 14 is related to the pressure difference (P2−P1), i.e. the same pressure difference operating in the opposite sense, by an equation of similar form: because the pressure difference (P1−P2) acts on the cylinders 12,14 in the opposite sense, increases in this pressure difference cause one of the frequencies $f_1$ and $f_2$ to increase and the other to decrease. Thus it can be shown that $$(P1-P2) = \text{function } (f_1-f_2) \quad (2)$$

Care should be taken in the selection of $f_1$ and $f_2$, which as already mentioned are merely approximately equal, to ensure that $(f_1-f_2)$ is monopolar for the full range of anticipated variation of (P1−P2).

It will be appreciated that the amplifiers 48 and 52 produce respective electrical output signals of frequency $f_1$ and $f_2$, which output signals are applied to the mixer 56. The mixer 56 produces an output signal containing the frequencies $(f_1-f_2)$ and $(f_1+f_2)$, the latter being substantially attenuated by the filter 58. There thus appears at the output terminal 62 of the transducer 10 an output signal of frequency $(f_1-f_2)$, which frequency is dependent upon, and therefore representative of, the pressure difference (P1−P2).

As already mentioned, the cylinders 12,14 have a residual temperature coefficient of elasticity, are sensitive to changes in the respective densities of the fluids to which they are exposed, and are also acceleration sensitive. However, since the cylinders 12,14 are very similar, e.g. they are made from the same material and have similar vibration characteristics, and since the cylinders are also similarly oriented, all three of these parameters, that is temperature, density and acceleration, affect both of the cylinders in the same sense by substantially similar amounts: the effects on the frequencies $f_1$ and $f_2$ produced by variations of these parameters therefore tend to cancel, at least to the first order, in the difference frequency $(f_1-f_2)$ of the output signal appearing at the output terminal 62 of the transducer 10. Errors due to long term drift in the properties of the material from which the cylinders 12,14 are made also tend to cancel in a similar manner, particularly if both cylinders are made from material from the same batch, i.e. melt, of the material.

Further advantages of the pressure transducer 10 are that its pressure sensitivity is approximately doubled with respect to that of a comparable single cylinder transducer, and the relationship between the pressure difference (P1−P2) and the output frequency $(f_1-f_2)$ is inherently rather more linear than the relationship between output frequency and pressure in such a comparable single-cylinder transducer. This latter advantage simplifies the design of the optional linearising circuit 60, or alternatively, if the circuit 60 is not provided, renders subsequent linearisation, e.g. by means of a microprocessor, more simple. Additionally, the transducer 10 is inherently capable of directly sensing pressure difference.

In order to sense absolute pressure, it is merely necessary to make one of the fluid pressures P1 and P2, preferably P2, a vacuum, while to sense "gauge pressure" (i.e. pressure relative to atmospheric pressure) it is merely necessary to make one of the fluid pressures, this time preferably P1, atmospheric pressure.

Several modifications can be made to the embodiment of the invention described with reference to FIG. 1. For example, the cylinders 12,14 can be made from a less expensive material than Ni-Span C902, for example, stainless steel a suitable stainless steel is that manufactured to BSI No. 416-S-21, for example by Firth Vickers Limited. Further the cylinders 12,14 need not be coaxially internested, but can be disposed side-by-side, with their respective axes parallel to each other, in separate casings: in this case, the cylinders can be more closely matched, e.g. their dimensions can be identical, but the transducer obviously becomes slightly larger.

Another important modification which can be made to the embodiment of the invention described with reference to FIG. 1 is to replace the mixer 56, filter 58 and linearising circuit 60 of FIG. 1 with a digital output circuit of the form indicated at 70 in FIG. 2. The circuit 70 is preferably implemented as one or more integrted circuits, and comprises two counters 72, 74 each connected to receive a respective one of the output signals of frequency $f_1$ and $f_2$ produced by the amplifiers 48 and 52 of FIG. 1. The counters 72,74 are arranged to accumulate respective counts representative of the frequencies $f_1$ and $f_2$ respectively, and these counts are then digitally linearised in respective linearising circuits 76,78, using a convenient algorithm for implementing the respective equation of the form of equation (1), to produce respective digital signals linearly representative of the pressures P1 and P2. These two pressure-representative digital signals are then applied to a digital subtraction circuit 80, which produces a digital output signal linearly representative of the pressure difference (P1−P2).

The linearising circuits 76,78 may both comprise apparatus of the general type disclosed in our U.K. patent specification No. 1,363,073.

If desired, the counts accumulated by the counters 72,74 may be subtracted first, and their difference linearised, using an algorithm for implementing equation (2), to produce the digital output signal representative of the pressure difference (P1−P2).

The modification described in relation to FIG. 2 is particularly desirable in cases where the lowest normal value of the frequency difference ($f_1 - f_2$) is relatively low, e.g. of the order of 100 Hz or less, and a fairly rapid response to changes in the pressure difference (P1−P2) is required.

What is claimed is:

1. A pressure transducer comprising:
   first and second similar hollow resonantly vibratable bodies whose respective resonant frequencies vary in dependence upon the difference in fluid pressure inside and outside the respective body, each of said bodies comprising a right cylinder integrally closed at one end and open at the other end,
   base means for sealingly closing the respective said other ends of the cylinders,
   casing means enclosing the cylinders,
   means for exciting and maintaining resonant vibrations of the cylinders and for producing respective output signals representative of said resonant frequencies, and
   means for applying a first fluid pressure to the inside of the first cylinder and to the outside of the second cylinder and for applying a second fluid pressure to the inside of the second cylinder and to the outside of the first cylinder, whereby said resonant frequencies vary in opposite senses in dependence upon the difference between first and second pressures, and the difference between said resonant frequencies, as represented by said output signals, is dependent upon said pressure difference, wherein the fluid pressure applying means comprises at least a first inlet conduit in said base means for applying said first fluid pressure to the inside of the first cylinder and a second inlet conduit in said base means for applying said second fluid pressure to the inside of the second cylinder.

2. A pressure transducer comprising:
   a base on which are mounted first and second resonantly vibratable hollow bodies whose respective resonant frequencies vary as a function of fluid pressure inside and outside the respective body;
   means for exciting and maintaining resonant vibrations of the bodies and for producing respective output signals representative of said resonant frequencies; and
   means for applying a first fluid pressure to the inside of the first body and to the outside of the second body and for applying a second fluid pressure to the inside of the second body and to the outside of the first body,
   said first body being structurally coupled to said second body only through said base.

3. A transducer claimed in claim 2, wherein each of said bodies comprises a right cylinder closed at one end.

4. A transducer as claimed in claim 3, wherein the cylinders are oriented similarly to each other.

5. A transducer as claimed in claim 3 or claim 4, wherein the first cylinder is disposed coaxially inside the second cylinder.

6. A transducer as claimed in claim 5, wherein the base means comprises a common base member in sealing engagement with the respective other end of each cylinder, the casing means comprises a common casing which sealingly engages the base member to define therewith an enclosure containing the cylinders, and the second inlet conduit passes through the base member to communicate with the space defined between the cylinders.

7. A transducer as claimed in claim 1 or claim 3 or claim 4, wherein one of said fluid pressures is a fixed reference pressure.

8. A transducer as claimed in claim 7, wherein said one pressure is substantially a vacuum, whereby the transducer serves as an absolute pressure transducer for the other pressure.

9. A transducer as claimed in claim 1 or claim 3 or claim 4, wherein one of said pressures is atmospheric pressure, whereby the transducer serves as "gauge pressure" transducer for the other pressure.

10. A transducer as claimed in claim 1 or claim 3 or claim 4, wherein each of the bodies is made of the same ferromagnetic material, and the vibration exciting and maintaining means comprises first and second vibration exciting and maintaining circuits associated with the first and second bodies respectively, each such circuit comprising a drive coil for subjecting its respective body to a magnetic field, a pick-up coil arranged to sense the vibrations of its respective body and an amplifier having its input coupled to the pick-up coil and its output coupled to the drive coil, whereby the vibrations of the respective body are maintained by feedback from the pick-up coil to the drive coil through the amplifier.

11. A transducer as claimed in claim 10, wherein each of said bodies comprises a right cylinder closed at one end, the first cylinder being disposed coaxially inside the second cylinder, and the coils of the first circuit are disposed inside the first cylinder while the coils of the second circuit are disposed outside the second cylinder.

12. A transducer as claimed in claim 11, further comprising a substantially cylindrical ferromagnetic screen coaxially disposed in the space defined between the cylinders.

* * * * *